Figure 1:
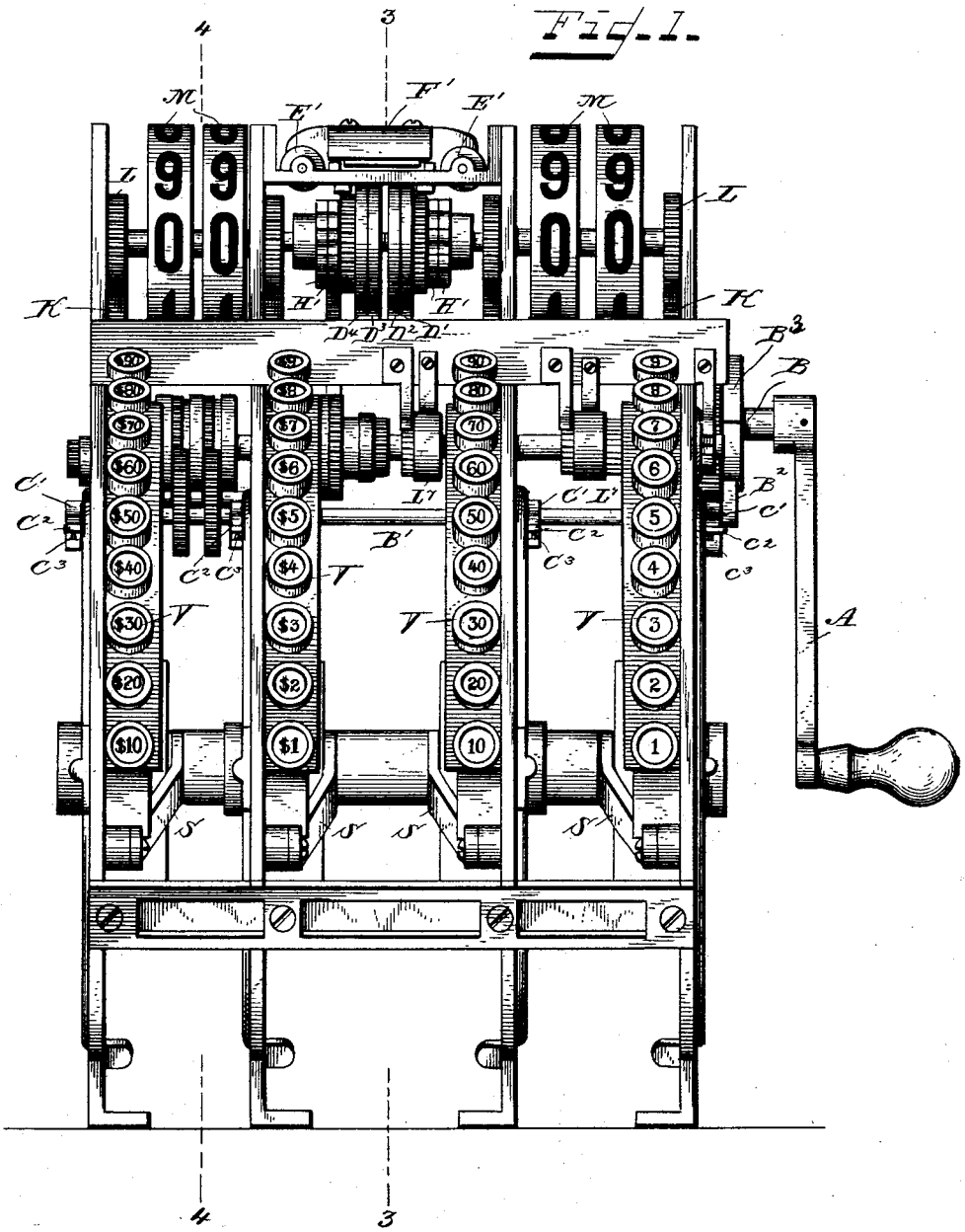

(No Model.) 8 Sheets—Sheet 1.

H. COOK.
CASH REGISTER, INDICATOR, AND RECORDER.

No. 464,294. Patented Dec. 1, 1891.

Witnesses.
J Thomas Cross
G Wentworth

Inventor:
Hugo Cook
by Peck & Rector
his Attorneys (No Model.) 8 Sheets—Sheet 3.

H. COOK.
CASH REGISTER, INDICATOR, AND RECORDER.

No. 464,294. Patented Dec. 1, 1891.

Witnesses.

Inventor:
Hugo Cook
by Peck & Rector
his Attorneys.

(No Model.) 8 Sheets—Sheet 4.
H. COOK.
CASH REGISTER, INDICATOR, AND RECORDER.
No. 464,294. Patented Dec. 1, 1891.
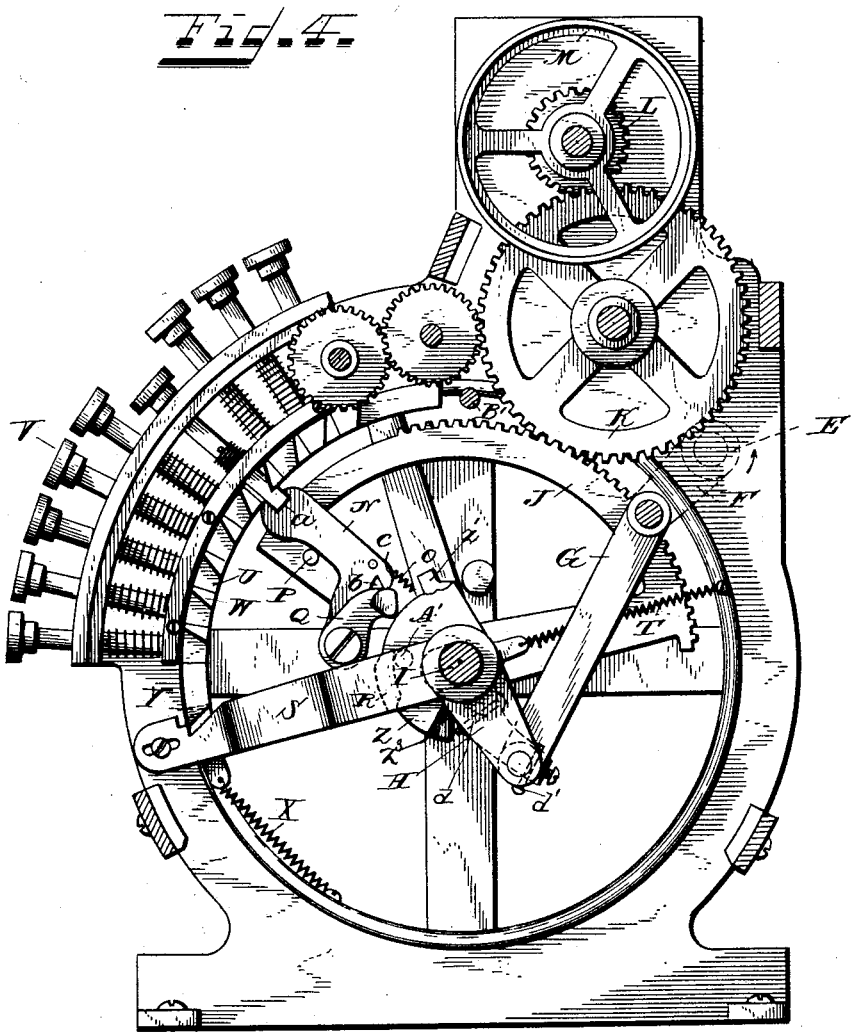

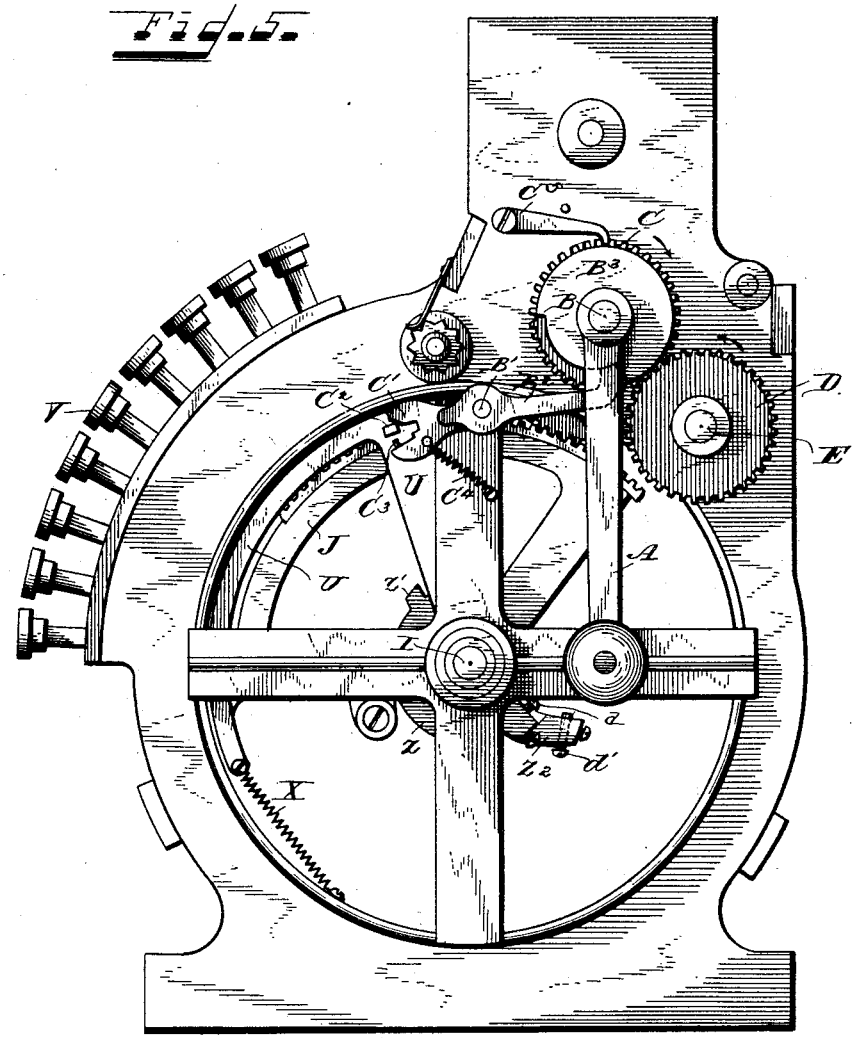

(No Model.) 8 Sheets—Sheet 6.
H. COOK.
CASH REGISTER, INDICATOR, AND RECORDER.
No. 464,294. Patented Dec. 1, 1891.
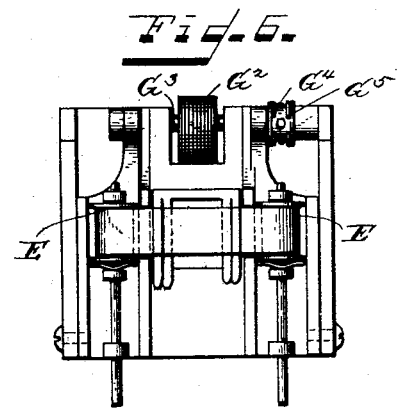
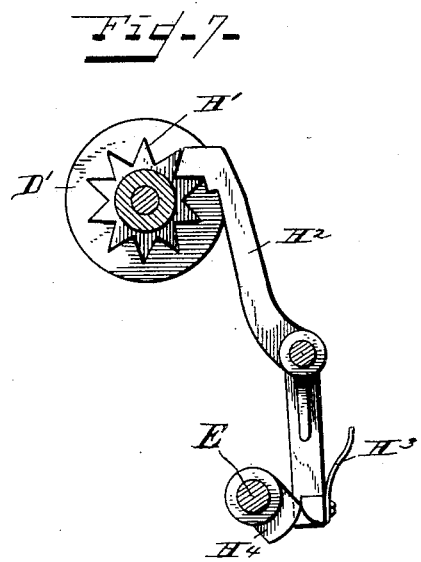
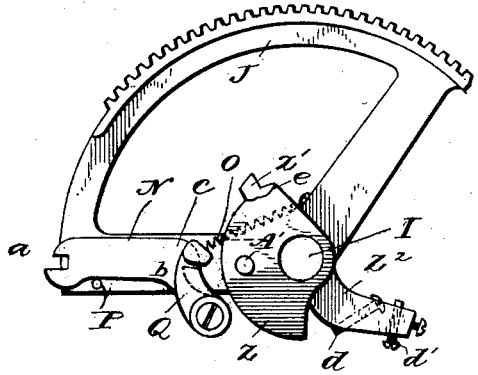
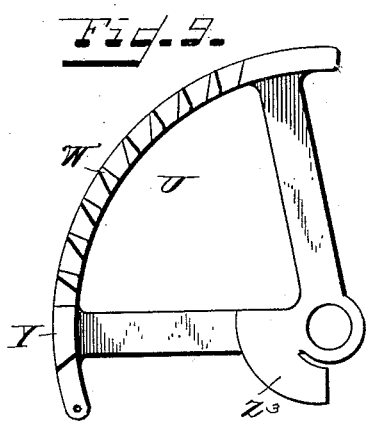
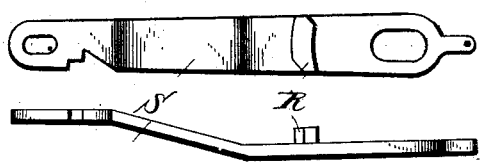
Witnesses.
Inventor.
Hugo Cook
per Peck & Reiter
Attorney (No Model.) 8 Sheets—Sheet 7.
H. COOK.
CASH REGISTER, INDICATOR, AND RECORDER.
No. 464,294. Patented Dec. 1, 1891.
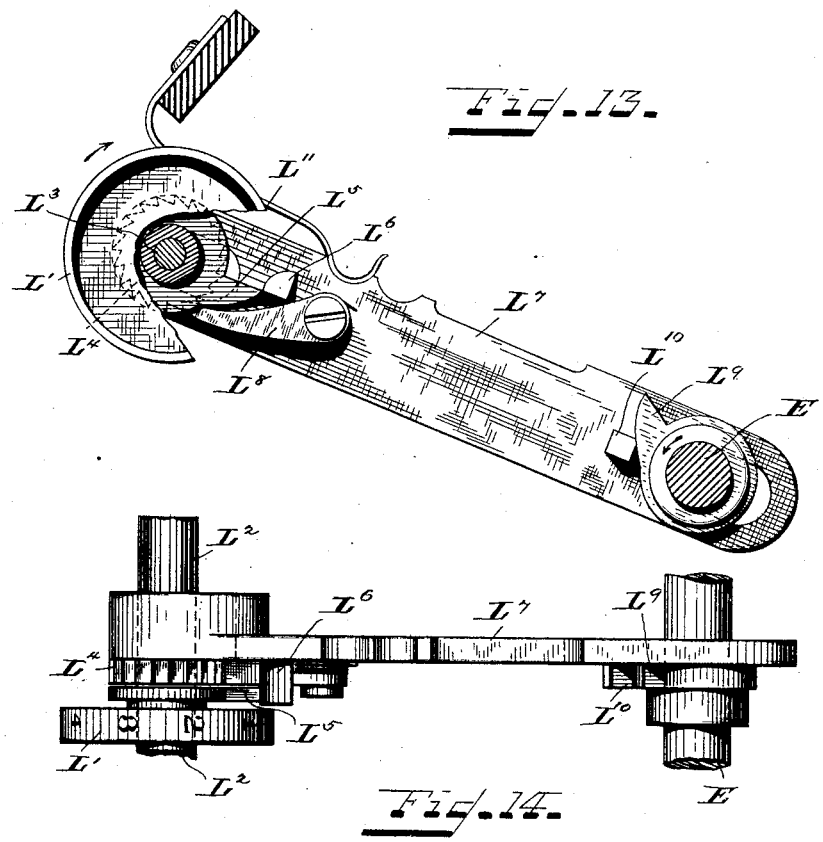
WITNESSES:
INVENTOR
Hugo Cook
BY
his ATTORNEYS (No Model.) 8 Sheets—Sheet 8.
H. COOK.
CASH REGISTER, INDICATOR, AND RECORDER.
No. 464,294. Patented Dec. 1, 1891.
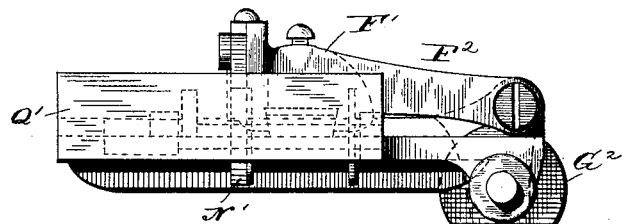
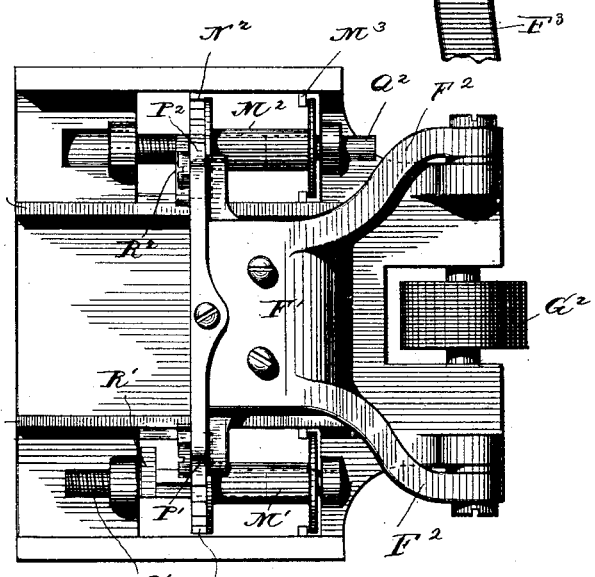
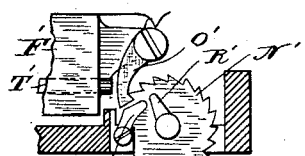
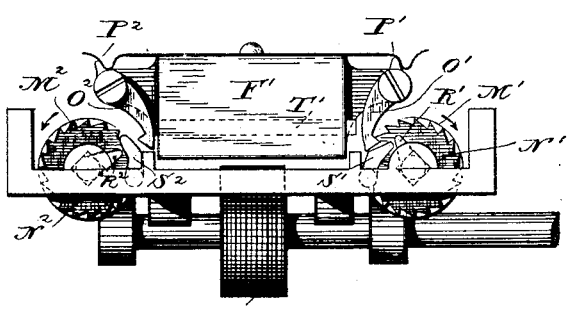
WITNESSES: INVENTOR
Hugo Cook
BY Peck & Reeter
his ATTORNEYS

UNITED STATES PATENT OFFICE.

HUGO COOK, OF DAYTON, OHIO.

CASH REGISTER, INDICATOR, AND RECORDER.

SPECIFICATION forming part of Letters Patent No. 464,294, dated December 1, 1891.

Application filed May 20, 1891. Serial No. 393,429. (No model.)

*To all whom it may concern:*

Be it known that I, HUGO COOK, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

My improved machine consists, essentially, of a main actuator for the indicator and register, a driving mechanism which may be connected with and disconnected from the actuator, and a series of keys whose relative positions determine the extent of movement imparted by the driving mechanism to the actuator, and consequently to the indicator and register. The main actuator consists in this instance of a gear-toothed segment mounted to oscillate back and forth upon a shaft or other suitable support. The indicator consists of a wheel bearing upon its periphery a series of numbers corresponding to the values to be indicated and registered and geared to the main actuator, so as to partake of its oscillatory movements in both directions. The driving mechanism consists of an oscillatory shaft or equivalent device, to which movement may be imparted by any suitable means, but preferably from a revoluble shaft having an operating-handle applied or geared thereto, a crank and pitman being interposed between the revoluble shaft and the oscillatory shaft. The registering-wheels are driven either directly from the main actuator or indirectly from it through the indicator-wheel. A type wheel or carrier having upon its periphery a series of type-figures corresponding to the numbers on the indicator-wheel is geared directly or indirectly to the main actuator, so as to move in unison with the indicator-wheel, and a printer co-operates with the type-wheel to print upon an interposed strip or ticket, or both, the number indicated by the indicator at each operation of the machine.

The machine which I have illustrated in the drawings is provided with four banks of keys, each containing nine keys and representing units of cents, tens of cents, units of dollars, and tens of dollars, respectively. There is a main actuator or gear-toothed segment co-operating with each bank of keys, and there is a separate indicator-wheel and likewise a separate type-wheel geared to each actuator. All four of the actuators transmit their movements to the same registering mechanism, and movement is imparted to all of them from the one oscillatory shaft before referred to, the latter being simply a support for part of the connecting devices interposed between it and the actuators and by which the driving mechanism is connected with and disconnected from said actuators.

The details of construction and operation of the various parts of the machine will be explained in connection with the accompanying drawings, in which—

Figure 2:
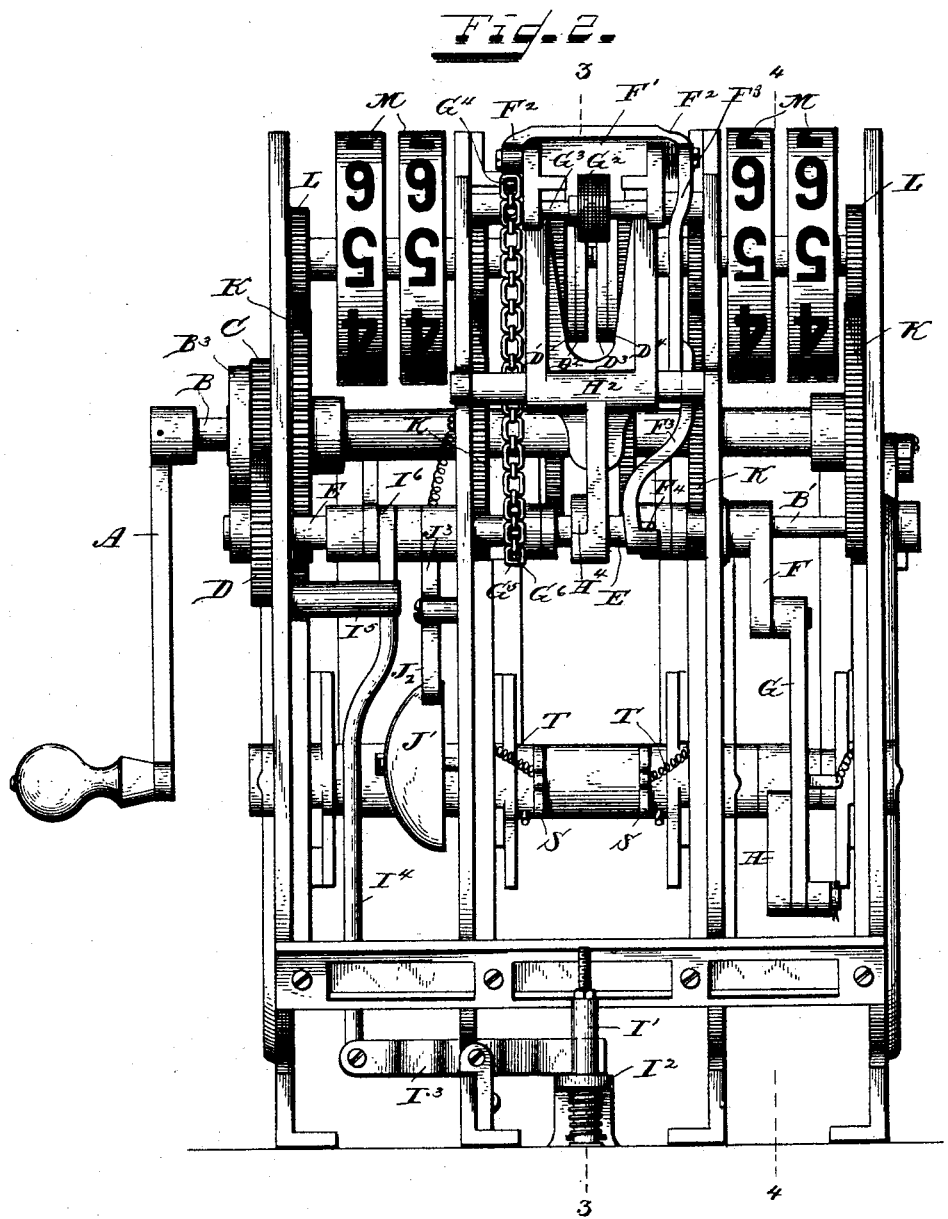
Figure 3:
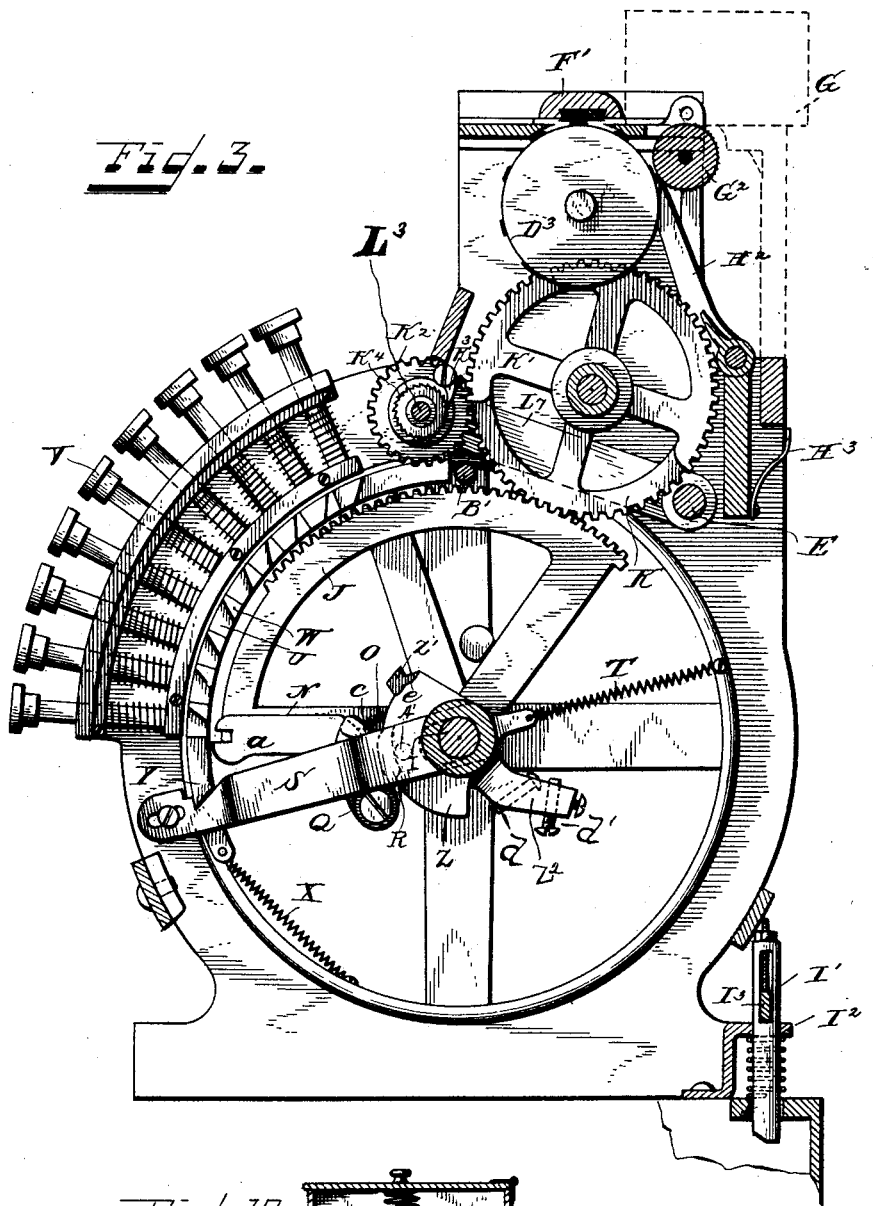
Figure 12:
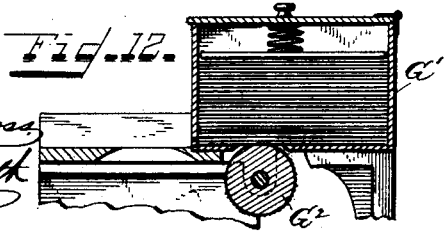

Figure 1 represents a front elevation of the working parts of the machine; Fig. 2, a rear elevation of the same; Fig. 3, a vertical section on the line 3 3 of Figs. 1 and 2, looking toward the left in Fig. 1; Fig. 4, a vertical section on the line 4 4 of Figs. 1 and 2; Fig. 5, a side elevation of the right-hand side of the machine. Fig. 5$^a$ is a detail view of the locking mechanism; Fig. 6, a detail top plan view of part of the printing-machine; Fig. 7, a detail of the locking-dog for one of the type-wheels; Fig. 8, a detail of one of the segments and the latch between it and the oscillatory shaft; Fig. 9, a detail of one of the detent-plates which co-operate with the keys; Figs. 10 and 11, details of one of the plates which hold the latch of an actuator out of operation when no key of the bank corresponding to that actuator has been operated; Fig. 12, a detail sectional view of the ticket-holder and associated parts; Figs. 13 and 14, enlarged detail views of the transfer devices between the registering-wheels; Fig. 15, an enlarged detail side elevation of the ticket-printing attachment; Fig. 16, an enlarged top plan view; Fig. 17, a corresponding front view of the same, and Fig. 18 a detail of a portion of the same.

The same letters of reference are used to indicate identical parts in all the figures.

As seen in Figs. 1, 2, and 5, the operating-handle A is fast upon the end of a shaft B, which has also fast upon it a gear C, which meshes with a gear D, fast upon the end of a parallel shaft E, which, as shown in Fig. 2, extends nearly across the machine, and at its end opposite the gear D has fast upon it a crank F. A pitman G, Figs. 2 and 4, connects the crank F with an arm H, fast upon a central oscillatory shaft I. It results from this construction that when the shaft B is given a complete revolution by the handle A the shaft I will be oscillated forward and back, its limit of stroke being in this instance about one-fourth of a revolution.
The gear-toothed segments J, which I have termed the "main actuators," are loosely mounted upon the central shaft I, and, as seen in Fig. 4, mesh with gears K, which in turn mesh with gears L, fast upon the hubs of the indicator-wheels M, so that in the oscillation of the segments J upon the shaft I the indicator-wheels M will move with them. Each of the segments J, as shown in Figs. 3, 4, and 8, carries a latch N, (see Fig. 8,) consisting of a bent arm pivoted at its lower end to a lug depending from one of the radial supporting-arms of the segment and projecting at its upper and outer end toward the periphery of the segment. Its outer end is provided with a recess $a$, and just below the angle of the arm the inner edge of its vertical portion is cut out to form a recess $b$ and above it an engaging-shoulder $c$, for a purpose to be presently explained. A spiral spring O, secured at one end to one arm of the segment and at its opposite end to the arm N near its angle, tends to pull the arm rearward and throw its outer end upward. A pin P upon the side of the segment limits the play of the arm N in a downward direction. Fast upon the side of the arm N is an arm Q, Figs. 4 and 8, whose upper end or nose is wider than the body of the arm. The laterally-projecting portion of the nose of this arm normally bears against the forward side of a cam-lug R upon the inner face of a radially-sliding plate S, Figs. 4, 10, and 11, which holds the arm N in the position shown in Figs. 3 and 8 against the tension of the spring O, which tends to pull it in the opposite direction. The plate S is supported on the frame-work at its outer end by a pin passing through a slot in the plate, and at its inner end is provided with a slot, which embraces the central oscillatory shaft I, while a spiral spring T constantly tends to pull it rearward and withdraw its lug R from engagement with the nose of the arm Q on the arm N and permit the spring O to pull the latter rearward. The plate S is normally held in the forward position (shown in Fig. 3) by a detent-plate U, which co-operates with the series of keys V of the bank to which the actuator and associated parts now being described belong. This detent-plate, as shown in Fig. 9, is segmental in form and is supported by radial arms upon the central shaft I. It is provided on one side with a series of detents W, which are adapted to engage notches in the stems of the keys V when the latter are pressed inward, as seen in Fig. 4. The keys, as shown, are carried in segmental guide-plates and are surrounded by spiral springs interposed between the inner guide-plate and pins passed through the keys, which springs yieldingly hold the keys in and return them to normal position. When any key is pushed in, the inner end of its stem strikes the beveled side of its co-operating detent W and rocks the detent-plate U slightly upward as it passes the detent, and the latter then engages the notch in the key and holds it in this inward position, as shown in Fig. 4. A spiral spring X, connected to the lower end of the detent-plate U, tends to pull the plate downward and hold it in the position shown in Fig. 3, in which position a tooth Y upon the side of the plate engages a notch in the upper edge of the plate S, before described, and normally holds the latter plate in its forward position (shown in Fig. 3) against the tension of the spring T, tending to pull it rearward.

Fast upon the shaft I, between the plate S and the segment J, is a cam-plate Z in the same vertical plane as the arm Q upon the arm N, before described, while upon the side of the plate Z, next to the segment J and in the same plane as the arm N, is a lug Z'. The periphery of the cam Z at the side of the lug Z' is cut away, as shown at $e$, for a purpose to be presently explained. A pin or lug A' projects from the side of the cam Z into the plane of the lug R upon the inner side of the plate S, and in the normal position of the cam Z stands at the rear side of the lug R, as shown in Figs. 3 and 4. If when the parts are in the position shown in Figs. 3 and 8, where the laterally-projecting portion of the nose of the arm Q bears against the forward side of the lug R and holds the arm N in its outer position, the handle A is revolved and the shaft I thereby oscillated forward and back, as before described, the lug Z' will just clear the rounded face of the shoulder $c$ on the arm N and will pass by it in both directions without removing the arm N; but if before the handle is revolved any one of the keys V is pushed inward and the detent-plate U thereby thrown upward, as before described, the tooth Y on the lower end of the detent-plate will be withdrawn from the notch in the plate S and the latter be thereby released from said plate; but it will be held from moving rearward under the tension of its spring T by the engagement of the pin A' on the cam Z with the rear side of the lug R; but as the shaft I and cam Z oscillate forward the pin A' is carried below the lug R, so that the spring T can then pull the plate S slightly rearward, its movement in such direction being arrested either by the engagement of the tooth Y with a shoulder above and in front of the notch in the plate or determined by the length of the slots in its ends. This rearward movement of the plate S withdraws the lug R from the nose of the arm Q and permits the spring O to pull the arm N slightly rearward until the arm Q engages and rests upon the periphery of the cam Z, the nose of the arm Q, as before explained, being wide enough to engage both the lug R and the cam Z. This engagement of the arm Q with the cam Z is then the only thing which prevents the spring O from pulling the arm N still farther rearward. Such being the case, as soon as the cam Z is moved forward and downward until the cut-out space $e$ in its periphery is brought beneath the nose of the arm Q and the lug Z' into line with the recess $b$ in the arm N the spring O will pull the arm N farther rearward and engage the recess $b$ with the lug Z'. This will connect the shaft I with the segment J, so that when the shaft begins its backward movement it will carry the segment with it until the outer projecting end of the arm N below the recess $a$ strikes the inner end of the key which has been pressed in, whereupon the arm N will be arrested by the key and rocked far enough on its pivotal support to permit the lug Z' to slip out of the recess $b$, and thereby disconnect the oscillating shaft from the segment, the former returning to its initial position alone and the latter remaining at the point where it has been arrested by the engagement of the arm N with the operated key, as seen in Fig. 4. As shown in that figure, the inner end of the operated key enters the recess $a$ in the outer end of the arm N, and the engagement of the nose of the arm Q with the periphery of the cam Z holds the arm N in this position during the further return movement of the cam Z and shaft I, and the arm and segment thereby become locked to the key and cannot move in either direction until the key is released. Just as the shaft completes its backward stroke a set-screw $d$, carried by an arm $Z^2$, fast upon the shaft I, Fig. 8, strikes the rear side of a lower extension $Z^3$ of one of the radial supporting-arms of the detent-plate U, Fig. 9, and rocks said plate slightly upward, thereby releasing the operated key and permitting its spring to throw it outward to normal position. The adjustment of the parts is such that the shaft I completes its backward stroke shortly before the operating-handle A reaches its initial position, and the shaft is moved slightly forward again to the position seen in Fig. 3 before the handle reaches such position, so that when the handle comes to rest the set-screw $d$ has been moved out of engagement with the extension $Z^3$ of the detent-plate and the spring X has pulled the latter downward again to normal position, so that when another key is pushed inward it will be caught and held by its co-operating detent, as before explained. During the return upward movement of the cam Z the pin A' engages the beveled lower portion of the rear side of the lug R and forces the plate S forward to normal position, as shown in Fig. 4. In the position of the parts in that figure the operating-handle has not quite completed its return stroke. As it completes such stroke and the arm F and pitman G are brought into line with each other the shaft I and cam Z reach their limit of backward movement and the detent-plate U is moved to release the operated key in the manner above explained and is then pulled downward by the spring X, and its tooth Y re-engages the notch in the plate S. As the operating-handle is brought to initial position the pivotal point connecting the arm F and pitman G is moved rearward of a straight line through said arm and pitman and the shaft I and cam Z oscillated slightly forward again to the position shown in Fig. 3, as heretofore explained. After the operated key has been released in the manner above explained the segment remains in the position shown in Fig. 4 until the handle A is again revolved, whereupon as the shaft I is oscillated forward again and the lug Z' moved with it the latter will just clear the shoulder $c$; but as it comes into line with the recess $b$ the cut-away portion $e$ of the periphery of the cam Z is brought under the nose of the arm Q, so that the spring O is permitted to pull the arm N rearward and engage the recess $b$ with the lug Z'. At the same time a second set-screw $d'$ in the arm $Z^2$, which carries the screw $d$, Figs. 3, 4, 5, and 8, will engage the lower side of the rear supporting-arm of the segment and carry the arm N and segment forward with it. The lateral projection of the nose of the arm Q will ride over the forward side of the lug R on the plate S and will force the arm N outward again to the position shown in Fig. 3, and thereby disengage the recess $b$ from the lug Z', so that in their return strokes the shaft I, cam Z, and lug Z' will move back alone and the segment J and arm N will remain in the position shown in Fig. 3. The engagement of the lug R with the arm Q will hold the arm N in this position until another one of the keys V is pushed inward, the detent-plate U thrown upward, the plate S released from the tooth Y, the cam Z oscillated forward to carry the pin A below the lug R, and the spring T permitted to pull the plate S rearward, and its lug R thereby moved away from the arm Q, as before explained. It will thus be seen that if the shaft I be oscillated forward and back at any time without a key of this bank having been depressed the lug Z' will not engage the arm N, and the segment J will remain stationary. The adjustment of the parts is such that when the segments J and arms N are in the position shown in Fig. 3 the indicator-wheels M will all stand with their zeros exposed at the reading-opening in the casing which incloses the machine, as shown in Fig. 1, and when in the operation of the machine any segment J is arrested in its backward movement and disconnected from the shaft by the engagement of its arm N with a key which has been pressed inward the indicator-wheel will have been turned until its number which corresponds to the value of the depressed key has been brought to the reading-opening. Thus in Fig. 4 the key which has been depressed is the sixth from the bottom, and in the position of the parts there shown the indicator-wheel M will display the figure "6" at the reading-opening. If the uppermost key of the series has been the one depressed, the segment would not have been arrested until it had moved still farther backward and the indicator-wheel would have been turned far enough to expose the figure "9" at the reading-opening. On the other hand, if the lower key of the series had been the one depressed the segment J would have been arrested and disengaged from the shaft I at almost the beginning of their backward stroke and the wheel M would have been turned only far enough to expose the figure "1" at the reading-opening. So when the segments are carried back to the position shown in Fig. 3 by the forward movement of the shaft I, in the manner before explained, the indicator-wheels M are all brought to a point to expose their zeros at the reading-opening, and those of them which correspond to the banks in which no keys have been operated will, for the reasons heretofore explained, remain at zero, while those which correspond to the banks in which keys have been operated will be turned by their respective segments until the latter are disconnected from the shaft I at the proper points to indicate the values of the keys which have been operated, as will be readily understood. The registering-wheels of the machine are driven from the gears K, which mesh with the segments J, as seen in Fig. 3. As there shown, the gear K has fast upon its hub a segment-rack $K'$, which meshes with a gear $K^2$, which carries a pawl $K^3$, engaging the teeth of a ratchet $K^4$, which is fast upon the hub of one of the registering-wheels (not shown) in Fig. 3. As the segment J moves rearward and turns the gear K forward, the pawl $K^3$, carried by the gear $K^2$, turns the ratchet $K^4$ and registering-wheel a distance corresponding to that moved by the segment J and registers an amount corresponding to that indicated upon the wheel M, which is geared to the wheel K. As the segment J moves in the reverse direction in returning to the position shown in Fig. 3 and resetting the indicator-wheel to zero, the pawl $K^3$ slips backward over the ratchet $K^4$, and the ratchet and its registering-wheel remain stationary. The registering-wheel is thus caused to move in one direction with the indicator-wheel to register the amount indicated by the latter and to remain stationary while the indicator-wheel moves in the opposite direction. The only purpose of employing the segment-rack $K'$ to turn the gear $K^2$, instead of gearing the wheel K directly with the gear $K^2$, is to enable the gears K and $K^2$ to be located in different vertical planes. In the machine illustrated in the drawings the gear $K^2$ is located a short distance to the right of the plane of the gear K; but for this fact the gear K might have directly engaged the gear $K^2$ and the segment-rack $K'$ have been dispensed with.

It is only in the case of the particular gear K, which is shown in Fig. 3, that a segment-rack, such as $K'$, is employed. In the case of the other three gears K of the machine the segments J and gears K are located in the same plane as their respective gears $K^2$, and the gears K mesh directly with the gears $K^2$.

The machine is provided with one registering-wheel corresponding to each indicator-wheel and with as many additional registering-wheels as desired—in this instance three. Between the several wheels of the set are interposed transfer devices of novel construction, which will be hereinafter explained.

For the purpose of preventing forward movement of the operating-handle A, except at such times as one or more keys of the machine have been pressed inward and caught by their respective detents, I provide a lock which normally holds the handle from forward movement, but automatically releases it upon the depression of any key, and for the purpose of preventing depression of any of the keys after the handle has been started in its forward movement to indicate and register the values of the key or keys previously depressed I provide a lock which automatically locks all of the unoperated keys as soon as the operating-handle is started in its forward movement. I also provide a lock for preventing movement of the operating-handle when any key has been pushed inward a short distance, but not far enough to have its notch caught by its co-operating detent. These locks may be now described. Extending entirely across the machine at some distance above the central shaft I is a rock-shaft $B'$, Figs. 1, 2, 3, 4, and 5. Fast upon the right-hand end of this shaft, Fig. 5, is a rearwardly-extending arm $B^2$, Fig. 5, whose upwardly-bent rear end bears against the periphery of a cam-disk $B^3$, fast upon the gear C or shaft B, to which the operating-handle is secured. The disk $B^3$ has a portion of its periphery cut away, as shown at its lower forward side in Fig. 5. When the arm $B^2$ and disk $B^3$ are in the position shown in Fig. 5, it will be seen that the engagement of the rear end of the arm $B^2$ with the shoulder at the rear side of the cut-away portion of the disk $B^3$ will prevent any forward movement of the handle A. Also fast upon the rock-shaft $B'$, beside the arm $B^2$, is a forwardly-extending arm $C'$, Fig. 5. In the front end of the arm $C'$ is a recess or mouth forming two jaws, an upper and lower one. Extending between these jaws is a lug $C^2$, projecting laterally from the side of the detent-plate U, which co-operates with the right-hand bank of keys. The upper edge of the lug $C^2$ normally bears against or is in close proximity to the beveled under side of the upper jaw of the arm $C'$, as shown, so that when the detent-plate U is moved upward and rearward by the depression of any key in the set, as heretofore explained, the lug $C^2$ will throw up the front end of the arm $C'$, and thereby rock the shaft $B'$ and throw down the rear end of the arm B². The movement thus given the arm C' and arm B² is sufficient to disengage the rear end of the latter from the straight or abrupt portion of the shoulder at the rear side of the recess in the disk B³, so that the handle A can then be turned forward, the beveled or rounded portion of the shoulder still further depressing the end of the arm B² as it passes by it. There are four of the arms C' secured upon the rock-shaft B'—one beside each detent-plate U—as seen in Fig. 1, and each of the latter has a lug C² projecting into the recess in the front end of its corresponding arm C'. It results from this that whenever any one of the detent-plates U is moved upward and rearward by the depression of a key in the set with which it co-operates its lug C², engaging its arm C', will rock the shaft B' and cause the arm B² to release the disk B³ and handle A. Each of the lugs C² has a hole or recess in its under side, and the lower jaw of each of the arms C' is provided with an upwardly-projecting pin C³. As before stated, the forward movement of the handle A and disk B³, after the arm B² has been disengaged from the abrupt portion of the shoulder on the disk, still further depresses the arm B², and consequently further elevates the front end of the arm C'. This will cause the pins C³ to enter the holes in the lugs C² of the plates U which have not been moved by the depression of a key and will cause the pins C³ to move up in front of the lugs of those plates which have been moved by the depression of a key, in each case positively locking the plate U from any movement, and thereby preventing the depression of any more keys in any of the banks. Thus, if a key in the dollar-bank is depressed and none in the cent-bank shown in Fig. 5, the pin C³ in the latter figure will, when the handle A is started forward, enter the hole in the lug C², while the pin C³ on the arm co-operating with the detent-plate of the dollar set of keys will move in front of the lug C² on that plate, as will be readily understood.

It will be noticed that the lower side of the recess in the front end of the arm C' is provided with a shoulder near its rear side, rendering the recess narrower at its rear end, the purpose of which is as follows: When any key is pushed inward, it will at first throw the detent-plate upward and rearward far enough to cause the lug C² to enter this rear narrow portion of the recess. This will positively lock the arm C' from any movement up or down, so that even though the rear end of the arm B² has been disengaged from the abrupt portion of the shoulder on the disk B³, yet the handle is still locked from movement, because the beveled portion of the shoulder cannot ride over and depress the end of the arm B² in the manner before explained. When, however, the operated key has been pushed in far enough to engage its notch with its co-operating detent, the detent-plate is pulled slightly backward by its spring and the lug C² withdrawn from the narrow part of the recess, whereupon the front end of the arm C' can be moved farther upward and the operating-handle turned forward, as before explained. A spring C⁴, connected to the arm C', tends to pull its front end downward and throw up the rear end of the arm B². As the handle A completes its revolution the rear end of the arm B² enters the cut-out space in the disk B³, and just as the handle reaches its initial position the shoulder at the rear side of said space is brought against the end of the arm, and the handle is locked, as before. A pawl C⁵, engaging the teeth of the gear C, prevents movement of it and the handle A in a backward direction.

The next portion of the machine to be described is the printing attachment, by which the values indicated and registered may be separately printed upon a paper recording-strip or upon paper tickets, or both. This portion of the machine is illustrated most clearly in Figs. 1, 2, and 3.

As shown in Fig. 1, there are mounted in the upper middle portion of the machine, between the two sets of indicator-wheels, four type-wheels D', D², D³, and D⁴, each bearing upon its periphery a series of equidistant type-figures from zero to nine. These four type-wheels correspond to the four indicator-wheels, and each of them moves in unison with one of said indicator-wheels. For this purpose the wheel D² is fast upon the same shaft as the second or tens indicator-wheel M, and the wheel D³ is fast upon the same shaft as the third or dollar indicator-wheel M', while the wheels D' and D⁴ are indirectly geared to the two outside indicator-wheels by gearing, which it is deemed unnecessary to illustrate and describe in detail. The adjustment of the type-wheels relative to their respective indicator-wheels is such that when the zeros on the indicators are at the reading-opening the zeros upon the type-wheels are at the printing-point, which in this case is at the upper side of the type-wheels, and when any indicator-wheel is moved to expose one of its numbers at the reading-opening the corresponding number upon its connected type-wheel will be brought to the printing-point.

An inking-ribbon carried upon spools M' M² is passed across the upper sides of the type-wheels, while above the inking-ribbon is the impression-plate or printer F'. This printer consists of a metal frame carrying the usual rubber impression-pad, and is pivoted by rearwardly-extending arms F², Figs. 2, 15, and 16, to lugs upon the frame-work. The printer is free to rock slightly upon its pivotal support, and one of its rearwardly-extending arms F² (the right-hand one in Fig. 2) is provided with a downwardly-extending arm F³, Figs. 2 and 15, whose lower end is in position to be engaged by a cam F⁴, fast upon the shaft E, heretofore described. (See Fig. 2.) The adjustment of the parts is such that when the shaft E is revolved by the revolution of the operating-handle A (through the medium of the gears C and D) the cam $F^4$ will engage the lower end of the arm $F^3$ and throw it rearward just before the handle completes a revolution and reaches its inward position. The throwing of the lower end of the arm $F^3$ rearwardly throws the printer $F'$ downward and effects the printing of the type-numbers upon the paper strip or ticket inserted between the printer and the inking-ribbon.

The type may print upon a recording-strip carried within the machine or upon paper tickets inserted beneath the printer by hand; but for the purpose of having them print upon separate tickets automatically fed out from a supply carried within the machine I provide a receptacle for such supply of tickets and an automatic feeding device, which at each operation of the machine moves one of them over the type-wheels in position to have the type-numbers printed upon it. This receptacle is shown separately in Fig. 12 and in dotted lines in Fig. 3. It consists of a box $G'$, secured to the frame-work of the machine in the rear of the printer $F'$. The supply of tickets is placed in the box, and a spring confined between them and the lid of the box keeps them pressed to the bottom. A narrow horizontal slit at the lower forward corner of the box permits one ticket to pass out at a time. A toothed feed-wheel $G^2$, Figs. 2, 3, 6, and 12, fast upon a shaft $G^3$, journaled in the frame-work, projects through an opening in the bottom of the box $G'$ and bears against the lowermost ticket in the box. The left-hand end of the shaft $G^3$, which carries this feed-wheel, as shown in Fig. 2, has fast upon it a sprocket-wheel $G^4$, Figs. 2 and 4, and a drive-chain $G^5$ is passed around it and around a second sprocket-wheel $G^6$, fast upon the shaft E, so that when the latter shaft is revolved the shaft $G^3$ and feed-wheel $G^2$ revolve with it. A part of the periphery of the feed-wheel $G^2$ is not toothed or roughened, but is cut away and left smooth, as shown in Figs. 3 and 12, and the adjusted position of the wheel is such that as the handle A is turned forward to indicate and register the value of the operated key or keys and set the type-wheels the toothed portion of the wheel $G^2$ engages the lower ticket in the box and feeds it forward over the type-wheels; but when the handle has been turned far enough to complete the registration and indication and set the type-wheels the smooth portion of the type-wheel reaches the ticket, and the latter is not moved farther forward, but remains stationary over the type-wheels, while the cam $F^4$ on the shaft E presses back and passes the lower end of the arm $F^3$ and effects the printing.

At the beginning of the next operation of the machine the smooth portion of the feed-wheel is carried from under the tickets, and the toothed portion of it again engages the lowermost ticket and feeds it out to be printed, as will be readily understood.

Each of the type-wheels has rigidly secured to it a star-toothed wheel $H'$, Figs. 1 and 7. A frame $H^2$, Figs. 2, 3, and 7, pivotally supported near its middle, has two upwardly-extending arms, each pivoted with a locking-tooth adapted to be thrown into engagement with two of the wheels $H'$. The lower end of the frame is normally pressed inward and its locking-teeth held out of engagement with the wheels $H'$ by a spring $H^3$, Fig. 7, secured to the frame and bearing at its upper end against the inside of the casing of the machine. A cam $H^4$, fast upon the shaft E, is arranged to strike the lower end of the frame $H^2$ just after the type-wheels are set at the proper numbers and to throw the locking-teeth at the upper end of the frame $H^2$ into engagement with the wheels $H'$ and to thereby lock the type-wheels in position while the printing is being done, after which the cam $H^4$ slips past the lower end of the frame $H^2$, and the spring $H^3$ throws the upper end of the frame rearward again.

The base of the machine, (not shown,) upon which the working parts illustrated in the drawings rest, is to be provided with the usual spring-propelled money-drawer, and in Figs. 2 and 3 is shown the locking-bolt for this drawer and the means for disengaging it from the drawer to release the latter. This bolt $I'$ is vertically guided in a bracket $I^2$ and extends downward through an opening in the base of the machine into the drawer-compartment, where its lower end engages a locking plate or projection upon the upper rear side of the drawer in the usual or any suitable manner. A spiral spring surrounds the bolt $I'$ and is confined between the bracket $I^2$ and a pin passed through the bolt and presses the bolt downward. The right-hand end of the lever $I^3$, pivoted near its middle to a suitable support, passes through a slot in the bolt $I'$ above the bracket $I^2$. To the left-hand end of the lever $I^3$ is connected the lower end of a rod $I^4$, whose upper end passes through and is guided in a vertical hole in the end of a stud $I^5$, projecting inward from the side frame of the machine. A cam $I^6$, fast upon the shaft E in the same vertical plane as the upper end of the rod $I^4$, is arranged to strike the end of said rod when the shaft E revolves and to depress said rod and the left-hand end of said lever and lift its right-hand end, and with it the bolt $I'$, to release the money-drawer, whereupon the latter is thrown outward by its propelling-spring. The cam $I^6$ is adjusted in such position upon the shaft E that it will strike and pass by the upper end of the rod $I^4$ and release the drawer just before the operating-handle A completes its revolution and reaches its initial position. After the cam $I^6$ passes by the end of the rod $I^4$ the latter is lifted again and the drawer-bolt thrown downward into locking position by the spiral spring surrounding the bolt, so that when the drawer is pushed in it will become locked, and when the operating-handle A is again revolved it will be released as before. The machine is also provided with an alarm-bell J', Fig. 2, which is sounded by a striker J², pivoted near its middle to a stud upon the framework, and whose upper end is arranged to be struck by a cam J³, fast upon the shaft E, as will be readily understood.

The novel transfer mechanism between the registering-wheels, which has been heretofore referred to, is illustrated in detail in Figs. 13 and 14, and some portions of it are shown in Figs. 1, 2, and 3. The views in Figs. 13 and 14 illustrate simply one set of transfer devices interposed between two of the registering-wheels. In said figures, L' may be taken to be the primary of the two registering-wheels, and whose revolutions it is desired to register upon the secondary wheel. (Not shown.) The wheel L' is loosely mounted upon a sleeve L², loose upon a central shaft L³. The secondary wheel (not shown) is fast upon the sleeve L², while also fast upon said sleeve is a ratchet L⁴. Fast upon the hub of the wheel L' is a cam L⁵, which, in the revolutions of the wheel L', is arranged to strike a lug L⁶ upon the side of a sliding bar L⁷. This bar is mounted at its lower right-hand end by an oblong slot upon the shaft E, heretofore described, which shaft at each operation of the machine makes one complete revolution in the direction of the arrow in Fig. 13, and at its upper end by a similar slot upon the sleeve L². The bar L⁷ has pivoted to it a pawl L⁸, spring-pressed into engagement with the ratchet L⁴. Whenever the wheel L' makes a complete revolution the cam L⁵ strikes the lug L⁶ and throws the bar L⁷ downward to the right into the position shown in Fig. 13, thereby causing the pawl L⁸ to slip backward over the teeth of the ratchet L⁴. In this position of the parts, as the operating-handle continues its movement back to its initial position, a cam L⁹, fast upon the shaft E, will strike a lug L¹⁰ on bar L⁷ and throw said bar upward to the left again, thereby causing the pawl L⁸ to turn the ratchet L⁴ forward the number of teeth over which it has slipped backward, and to thereby turn forward the sleeve L² and the secondary registering-wheel fast upon it a corresponding distance. A spring L¹¹, engaging notches in the upper edge of the bar L⁷, yieldingly holds said bar in each of the positions to which it is moved by the cams L⁵ and L⁹. It results from this construction and arrangement of the parts that whenever the primary wheel L' completes a revolution the pawl-bar L⁷ is thrown to the right and its pawl set for the transfer, and is then thrown to the left again and its pawl turns the secondary registering-wheel and effects the transfer all at one operation of the machine. As shown in Figs. 13 and 14, the registering-wheels are divided into ten spaces and the ratchet L⁴ has twenty teeth, so that at each operation of the pawl-bar L⁷ the pawl L⁸ slips backward over two teeth of the ratchet L⁴, and then turns it forward that distance.

In Figs. 15, 16, and 17 I have illustrated the spools which carry the inking-ribbon for the printing attachment, the devices for automatically turning said spools to move the ribbon beneath the printer, and devices for automatically reversing the direction of movement of said spools when the ribbon has been wound from one to the other to cause it to be rewound upon the empty spool. As shown in Figs. 17 and 18, the flange at one end of each of the spools M' and M² has fast upon it a ratchet N' and N². The printer or impression device F', which vibrates up and down in the operation of the machine to effect the printing, has pivoted to ears at each side pawls O' and O², adapted to co-operate with the ratchets N' and N². The upper ends of these pawls above their pivotal supports are engaged by springs P' and P², so that when either pawl is rocked to a position to throw its upper end to one side of the retaining-bend in its spring the spring will yieldingly hold it in such position, and when its upper end is thrown to the opposite side of the bend in the spring the latter will yieldingly hold it in that position. In Fig. 17 the pawl O' is shown in engagement with the ratchet N' of the right-hand spool M', while the pawl O² is shown held out of engagement with the ratchet N² of the left-hand spool M² by the spring P². Under this position of the parts as the printer F' vibrates up and down each time the machine is operated, in the manner heretofore explained, the pawl O' will turn the spool M' one notch of the ratchet N' and wind the ribbon from the spool M² onto the spool M'. The spools M' and M² are mounted to slide upon and turn with shafts Q' and Q², supported in suitable bearings in the frame-work. For this purpose the spools may be feathered upon the shafts, or the latter may be squared or made of other polygonal shape and fit corresponding bores in the spools. In the drawings they are shown as squared. One end of each shaft is exteriorly threaded and the bearing in which it turns is correspondingly threaded. The result of this arrangement is that the turning of the spools causes longitudinal movement of their respective shafts. Each shaft has upon or integral with it an upwardly and inwardly projecting arm R' or R². Assuming the parts to be in the position shown in Figs. 16 and 17 and the pawl O', under the operations of the printer F', to be turning the spool M' in the direction of the arrow in Fig. 17 and winding the ribbon from the spool M², the turning of the shaft Q', with its spool M', will cause the shaft to move longitudinally to the right in Fig. 16, its arm R' moving and turning with it. When the arm R' in the movement of the shaft Q' to the right in Fig. 16 reaches the vertical plane of the pawl P', it will, as it revolves with the shaft Q', strike the under side of an arm S', pivoted to the frame-work below and in the plane of the pawl P', Fig. 17, and, forcing the upper end of said arm to the left in said figure, will disengage the tooth of the pawl P' from the ratchet N' and throw the upper end of said pawl to the right of the bend in the spring P', by which the pawl will then be maintained out of engagement with the ratchet N'. When the lower end of the pawl O' is moved to the left in the manner described, it strikes the end of a rod T', extending transversely through the printer F' and free to slide therein. The left-hand end of the rod T', when the rod is thrown to the left by the pawl O', strikes the lower end of the pawl O² and moves it to the left into engagement with the ratchet N², throwing the upper end of the pawl to the right of the bend in the spring P², which thereupon maintains the pawl in engagement with the ratchet. As the printer F' now vibrates up and down under the operations of the machine, the spool M² will be turned and the ribbon rewound upon it from the spool M'.

It will be understood that, the parts being in the position shown in Figs. 16 and 17, as the shaft Q' is moved to the right in Fig. 16 and the arm R' brought into the plane of the pawl O' and arm S' the revolutions of the opposite spool M², caused by the winding of the ribbon from it onto the spool M', will simultaneously move the shaft Q² longitudinally to the left and carry the arm R² from the position shown in Fig. 16 out to the position of the arm R² shown in said figure. When the shaft Q' has reached its limit of movement to the right and the arm R' has disengaged the pawl O' from the ratchet N' and engaged the pawl O², with the ratchet N², in the manner described, the revolutions of the spool M', caused by the rewinding of the ribbon onto the spool M², will move the shaft Q' back to its position shown in Fig. 16, and the revolutions of the spool M² will move the shaft Q² to the position shown in Fig. 16, whereupon the arm R² will strike an arm S², similar to the arm S', above described, and disengage the pawl O² from the ratchet N² and throw the pawl O' into engagement with the ratchet N', the parts assuming the position shown in Fig. 17, and the ribbon will be again wound on the spool M'. The length of the inking-ribbon and the adjustment of the parts relatively to each other may be made such that the ribbon will be completely wound from one spool onto the other while the shafts Q' and Q² are making one full longitudinal movement, so that the ribbon is automatically wound from one spool onto the other to present fresh inking-surfaces to the types, and when it has been moved its length in one direction the revolution of the spools is automatically reversed and the ribbon moved its full length in the other direction.

Having thus fully described my invention, I claim—

1. In a registering-machine, the combination of a main actuator, a driving mechanism therefor capable of connection therewith and disconnection therefrom, a series of keys whose relative positions determine the different points at which the actuator shall be disconnected from the driving mechanism, an indicator-wheel geared to the actuator and moving therewith, a type wheel or carrier moving in unison with the indicator-wheel, and a printer actuated by the driving mechanism and co-operating with the type-wheel.

2. In a registering-machine, the combination of an oscillatory shaft, a gear-toothed segment mounted on said shaft, a latch for connecting the segment with and disconnecting it from the shaft, a series of keys co-operating with the latch and whose relative positions determine the different points at which the segment shall be disconnected from the shaft, an indicator-wheel geared to the segment, a type-wheel moving in unison with the indicator-wheel, and a printer actuated by the driving mechanism and co-operating with the type-wheel.

3. In a registering-machine, the combination of a revoluble shaft and a handle for operating the same, an oscillatory shaft, a crank and pitman connection between the two shafts, a series of gear-toothed segments loosely mounted upon the oscillatory shaft, latches for connecting the segments with and disconnecting them from the oscillatory shaft, a series of banks of keys, one bank for each segment and co-operating with the latch thereof to disconnect the segment from the oscillatory shaft at different points, according to the key which is operated, a series of indicator-wheels, one for each bank of keys and its associated segment and geared to the latter, a series of type-wheels, one corresponding to each indicator-wheel and moving in unison therewith, and a printer co-operating with the type-wheels and actuated by the revoluble shaft.

4. In a registering-machine, the combination of a main actuator, a driving mechanism therefor capable of connection therewith and disconnection therefrom, a series of keys whose relative positions determine the different points at which the actuator shall be disconnected from the driving mechanism, an indicator-wheel driven by the actuator, and a lock actuated by the driving mechanism at the beginning of its movement to lock the unoperated keys while the indicator-wheel is being moved to indicate the value of the operated key.

5. In a registering-machine, the combination of a revoluble shaft and a handle for operating the same, an oscillatory shaft actuated by the revoluble shaft, an actuator capable of connection with and disconnection from the oscillatory shaft, a series of keys whose relative positions determine the different points at which the actuator shall be disconnected from the oscillatory shaft, and a lock applied to the revoluble shaft to lock the same and its operating-handle from movement and actuated by the keys to release the shaft and handle whenever any key is operated.

6. In a registering-machine, the combination of the gear-toothed segment J, the latch N, pivoted thereto and provided with the recess $b$ and shoulder $c$, the cam Q, the oscillating cam Z, co-operating with the arm Q, and the lug Z, co-operating with the recess $b$ and shoulder $c$, and the keys V, co-operating with the outer end of the arm N to disconnect the latter from the lug Z'.

7. In a registering-machine, the combination of a gear-toothed segment J, the latch-arm N, pivoted thereto and provided with the recesses $a$ and $b$ and shoulder $c$, the cam Q, oscillating cam Z, co-operating with the cam Q, and the lug Z', co-operating with the recess $b$ and shoulder $c$, the keys V, co-operating with the recess $a$ in the outer end of the arm N to disconnect the latter from the lug Z', the detent-plate U, and the plate S, co-operating with the plate U and provided with the lug R, co-operating with the cam Q to hold the arm N out of engagement with the lug Z' when no key of the series has been operated.

8. In a registering-machine, the combination of a gear-toothed segment J, the latch-arm N, pivoted thereto and provided with the recesses $a$ and $b$ and shoulder $c$, the cam Q, the oscillating cam Z, co-operating with the cam Q, and the lug Z', co-operating with the recess $b$ and shoulder $c$, the keys V, co-operating with the recess $a$ in the outer end of the arm N to disconnect the latter from the lug Z', the detent-plate U, provided with the tooth Y, the sliding plate S, having a notch co-operating with the tooth Y and provided with the lug R, co-operating with the cam Q and also with a lug A' on the cam Z, and the arm $Z^2$, rigid with the cam Z and arranged to move the detent-plate U at the completion of the forward stroke of the cam Z to release the operated key.

9. In a registering-machine, the combination of the revoluble shaft B, having the handle A and gear C fast thereon, the revoluble shaft E, having fast upon it a gear D, meshing with the gear C and also the crank F, the oscillating shaft I, having fast upon it the arm H, the pitman G, connecting the crank F with the arm H, the segments J, loosely mounted on the shaft I, the latches for connecting the segments with and disconnecting them from the shaft I, the series of banks of keys V, co-operating with the latches, the indicator-wheels M, geared to the segments J, the type-wheels driven by the segments J and moving with the wheels M, the printer F', co-operating with the type-wheels and actuated by a cam $F^4$, fast upon the revoluble shaft E, and the registering-wheels driven by the segments J to register the values indicated by the wheels M.

10. In a registering-machine, the combination of the cam-disk $B^3$, revoluble with the operating-handle A, the series of banks of keys V, the detent-plates U, the rock-shaft B', having fast thereon the arms C', co-operating with the lugs $C^2$ upon the detent-plates U, and the arm $B^2$, fast upon the rock-shaft B' and co-operating with the disk $B^3$ to alternately lock and release the operating-handle and the detent-plates in the manner described.

11. In a registering-machine, the combination of the indicator-wheels, the type-wheels geared thereto, the printer, the ticket-receptacle containing the supply of tickets, and the feed-wheel having a portion of its circumference toothed or roughened and a portion cut away or left smooth to intermittently feed the tickets from the receptacle to the printing-point.

12. In a registering-machine, the combination of the drawer-locking bolt I', lever $I^3$, vertically-sliding rod $I^4$, and the revoluble shaft E, having fast upon it the cam $I^6$, co-operating with the rod $I^4$.

13. In a registering-machine, the combination of a main actuator, an indicator driven thereby, a driving mechanism for the actuator capable of connection therewith and disconnection therefrom, a series of keys whose relative positions determine the different points at which the actuator shall be disconnected from the driving mechanism, each of said keys being provided with a detaining notch or shoulder, a detent-plate co-operating with the series of keys, and a lock for the driving mechanism released by the detent-plate only when the detaining notch or shoulder of an operated key has been engaged with its co-operating detent on said plate.

14. In a registering-machine, the combination of a primary wheel provided with a cam $L^5$, the sliding bar $L^7$, provided with lugs $L^6$ and $L^{10}$ and carrying the pawl $L^8$, engaging the ratchet $L^4$ of the secondary wheel, and the revoluble cam $L^9$, co-operating with the lug $L^{10}$, substantially as described.

15. In a registering-machine, the combination of a primary wheel provided with a cam $L^5$, a revoluble shaft E, provided with a cam $L^9$, a sliding pawl-bar $L^7$, provided with a lug $L^6$, co-operating with the cam $L^5$, and a lug $L^{10}$, co-operating with the cam $L^9$ and carrying a pawl $L^8$, engaging the ratchet $L^4$ of the secondary wheel, and a spring $L^{11}$, engaging the bar $L^7$ to yieldingly hold it in the positions to which it is moved by the cams $L^5$ and $L^9$, substantially as described.

16. In a registering-machine, the combination of the driving mechanism, the actuating-segments capable of connection therewith and disconnection therefrom, the type-wheels geared to the segments, the printer co-operating with the type-wheels, the ribbon-spools actuated by the movements of the printer, and means for automatically reversing the direction of movement of said spools, for the purpose described.

17. In a registering-machine, the combination of the driving mechanism, the actuating-segments capable of connection therewith and disconnection therefrom, the type-wheels geared to the segments, the printer co-operating with the type-wheels, the spools carrying the inking-ribbon, each provided with a ratchet, an actuating-pawl for each ratchet, and means for automatically disengaging one pawl from its ratchet and engaging the other pawl with its ratchet to reverse the direction of movement of the inking-ribbon, substantially as described.

18. In a registering-machine, the combination, with the type-wheels and the printer co-operating therewith, of the spools carrying the inking-ribbon, each provided with a ratchet, an actuating-pawl for each ratchet carried by the printer, and the longitudinally-movable threaded shafts upon which the spools are mounted, provided with arms arranged to disengage the pawls from the ratchets, substantially as described.

19. In a registering-machine, the combination, with the type-wheels and the printer co-operating therewith, of the spools carrying the inking-ribbon, each provided with a ratchet, an actuating-pawl for each ratchet, and the longitudinally-movable threaded shafts upon which the spools are mounted, said shafts being free to slide through the spools, but revolving with the spools, and provided with arms to disengage the pawls from the ratchets, substantially as described.

HUGO COOK.

Witnesses:
THOMAS CORWIN,
EUGENE CHAPIN.